United States Patent [19]

Hillig

[11] Patent Number: 4,737,476

[45] Date of Patent: Apr. 12, 1988

[54] COMPOSITE BY INFILTRATION

[75] Inventor: William B. Hillig, Ballston Lake, N.Y.

[73] Assignee: General Electric Company, Schenectady, N.Y.

[21] Appl. No.: 866,416

[22] Filed: May 23, 1986

[51] Int. Cl.[4] ............................................. C04B 35/02
[52] U.S. Cl. ...................................... 501/87; 501/96; 501/98; 264/60; 264/62; 427/376.2; 427/397.7
[58] Field of Search .............. 501/8, 9, 87, 96, 98; 264/62, 60; 427/397.7, 376.2

[56] References Cited

U.S. PATENT DOCUMENTS

| | | | |
|---|---|---|---|
| 2,422,215 | 6/1947 | Amberg et al. | 427/376.2 |
| 3,849,145 | 11/1974 | Pitha | 501/9 |
| 4,004,052 | 1/1977 | Bystrova et al. | 427/376.2 |
| 4,220,455 | 9/1980 | St. Pierre et al. | 264/60 |
| 4,238,433 | 12/1980 | Hillig et al. | 264/60 |
| 4,636,480 | 1/1987 | Hillig | 501/96 |

*Primary Examiner*—Steven Capella
*Attorney, Agent, or Firm*—Jane M. Binkowski; James C. Davis, Jr.; James Magee, Jr.

[57] ABSTRACT

A composite comprised of a continuous matrix phase having a ceramic filler phase distributed therein is produced by shaping a mixture of ceramic filler and a solid constituent of the matrix into a compact and infiltrating the compact with a molten constituent of the matrix which combines with the solid constituent by dissolution and/or diffusion to produce the matrix in situ.

26 Claims, 2 Drawing Sheets

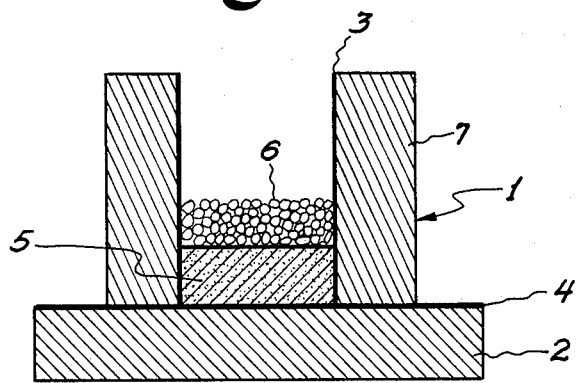
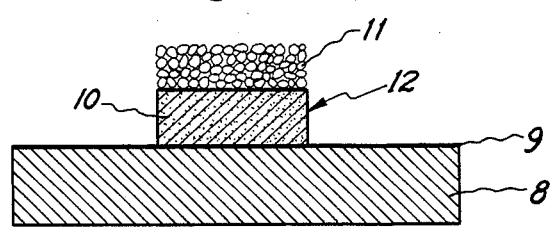

COMPOSITE BY INFILTRATION

This invention relates to the production of a composite comprised of an inorganic matrix and ceramic filler by forming a mixture of the ceramic filler and a solid constituent of the matrix into a compact, and infiltrating the compact with a molten constituent of the matrix to form the matrix in situ.

The following patent applications are assigned to the assignee hereof and are incorporated herein by reference:

Ser. No. 803,172 filed Dec. 2, 1985 for "Composite by Infiltration" by W. B. Hillig discloses the production of a composite by shaping a ceramic filler into a porous compact and infiltrating the compact with liquid alkaline earth silicate or alkaline earth aluminosilicate.

Ser. No. 740,444, filed June 3, 1985 for "Composite of Si₃N₄ by Infiltration" by M. K. Brun and W. B. Hillig discloses a composite produced by infiltrating the open pores of a sintered polycrystalline silicon nitride body with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of said fluoride and a metal oxide.

Ser. No. 759,815, filed July 29, 1985 for "Composite by Infiltration" by W. B. Hillig discloses the production of a composite by forming a porous compact of a ceramic member selected from the group consisting of boron carbide, hafnium carbide, hafnium nitride, niobium carbide, niobium nitride, silicon carbide, silicon nitride, tantalum carbide, tantalum nitride, titanium carbide, titanium nitride, vanadium carbide, vanadium nitride, zirconium carbide and zirconium nitride, and infiltrating the compact with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride, and a mixture of said fluoride with a metal oxide.

There are certain limitations in infiltrating a molten matrix material into a compact to form a ceramic composite. The molten matrix material may not have the requisite fluidity characteristic to function well as an infiltrant. For example, its viscosity may be so high as to require an excessive amount of infiltration time, or it may be so high as to prevent infiltration. Also, the matrix material may have an excessively high melting point, or the molten material may require an impractically high temperature to impart a useful lower viscosity. High infiltration temperatures not only make a process economically unfeasible, but also are likely to affect the compact material deleteriously.

The present process enables infiltration to be carried out at significantly lower temperatures within commercially useful time periods.

Briefly stated, the present process for producing a composite comprised of a matrix phase and a ceramic filler phase and having a porosity of less than about 10% by volume comprises forming a mixture of ceramic filler and a solid constituent of said matrix, shaping said mixture into a compact having an open porosity ranging from about 30% by volume to about 95% by volume of the compact, contacting said compact with an infiltrant which is the remaining constituent of said matrix phase, said infiltrant constituent having a liquidus temperature lower than 1900° C. and a viscosity of less than 30 poises at its liquidus temperature, heating the resulting structure to an infiltration temperature ranging from the liquidus temperature of said infiltrant constituent to below the temperature at which there is significant vaporization of said infiltrant constituent, said infiltrant constituent having a liquidus temperature at least 100° C. lower than that of said matrix phase and/or a maximum viscosity at least 50% less than that of said matrix phase at infiltration temperature, and infiltrating the resulting liquid infiltrant constituent into said compact to produce said composite.

In another embodiment of the present process, wherein upon completion of the infiltration step the solid constituent of the matrix in the compact has not dissolved and/or diffused into the infiltrated constituent of the matrix to produce the matrix phase, the infiltrated compact is subjected to a homogenization step. Specifically, it is heated at a homogenization temperature at which all or substantially all of the solid constituent dissolves and/or diffuses into the infiltrated constituent forming the matrix phase in a period of time of less than 100 hours to produce the present composite.

In the present process, all or substantially all of the constituents of the matrix composition combine and ultimately transform to the phase equilibrium state determined by the overall combined composition. Therefore, the overall composition of the matrix is determined by the composition of the infiltrating liquid, the composition and amount of solid constituent incorporated into the compact, and the porosity of the compact.

Briefly stated, the present composite is comprised of a ceramic filler phase ranging in amount from about 5% by volume to about 70% by volume of the composite, and a continuous interconnecting matrix phase ranging in amount from about 30% by volume to about 95% by volume of the composite. The matrix phase is an inorganic composition having a liquidus temperature of at least about 1200° C. and which generally ranges from about 1200° C. to about 2200° C.

Those skilled in the art will gain a further and better understanding of the present invention from the detailed description set forth below, considered in conjunction with the figures accompanying and forming a part of the specification, in which:

FIG. 1 is a sectional view through a structure showing an embodiment for carrying out the present process;

FIG. 2 is a sectional view through another structure showing another embodiment for carrying out the present process.

Figure 3:
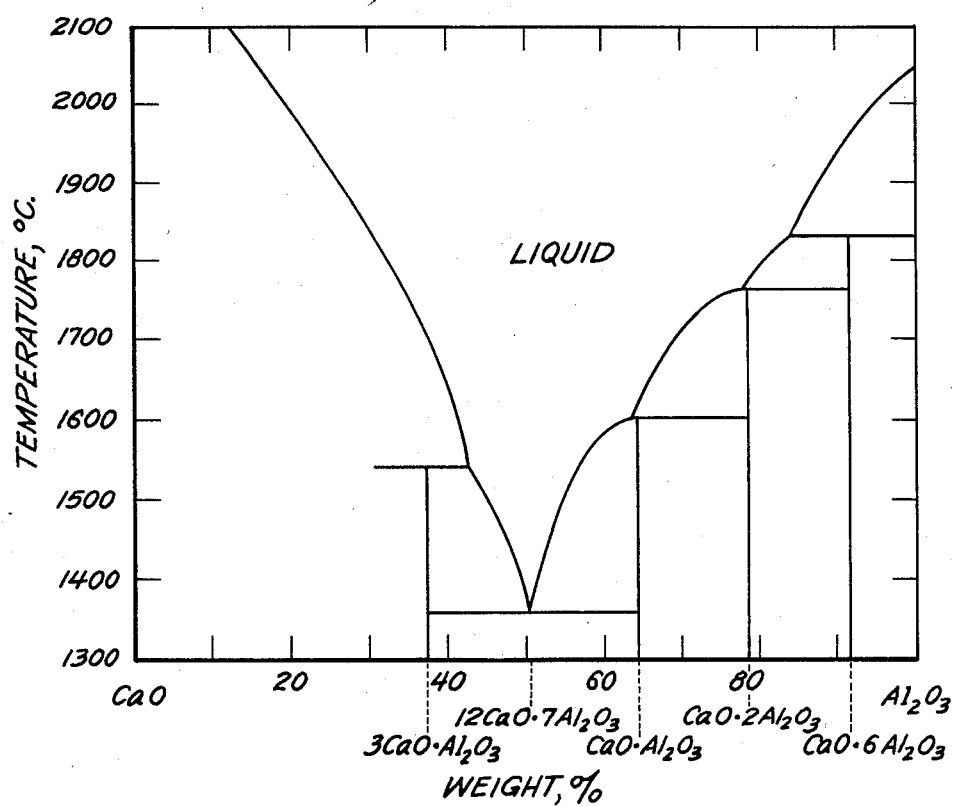
FIG. 3 is a phase diagram for the calcium oxide-aluminum oxide system showing various calcium aluminates.

FIG. 1 is a cross section of a structure 1 which illustrates one embodiment of the present process prior to infiltration. Graphite cylinder 7 and graphite base 2 have a coating of boron nitride 4 and 3 to prevent any sticking and facilitate removal of the resulting composite. Porous compact 5 is comprised of a cold-pressed powder mixture of the ceramic filler and a solid constituent of the matrix phase. A layer of granules of infiltrant 6 comprised of the remaining constituent of the matrix phase is shown in contact with compact 5 and covers its entire top surface.

FIG. 2 shows a cross section of a free standing assembly 12 of a layer of granules of infiltrant constituent 11 in contact with the upper surface of porous compact 10 comprised of a mixture of ceramic filler and solid constituent of the matrix. Assembly 12 is set on graphite base 8 having a boron nitride coating 9 to prevent sticking.

Graphite cylinder 7 and bases 2 and 8 are a convenience and are not required for carrying out the present process. However, structures chemically inert to the ceramic filler and matrix constituents such as graphite cylinder 7 and base 2 provide greater precision in the making of a finished product and also provide better control of the amount of infiltrant which is needed to penetrate the compact.

The present ceramic filler is a polycrystalline inorganic material which is a solid at processing temperature. Specifically, the ceramic filler of the composite has the characteristic of being stable at the temperatures necessary for processing or it is not significantly affected by the processing temperatures. In the present process, the ceramic filler is sufficiently inert so that no significant reaction, and preferably no reaction detectable by scanning electron microscope, occurs between it and the constituents of the matrix phase or the matrix phase. Also, the ceramic filler is at least sufficiently wettable by the infiltrant constituent to allow the present infiltration to occur by capillarity. Preferably, the present infiltrant constituent of the matrix has a contact or wetting angle against the filler of less than 90° C. The present process has no significant deleterious effect on the ceramic filler. Generally, the filler functions as a reinforcing, toughening, matrix grain size controlling material and or abrasion resisting material.

The particular ceramic filler or mixture of fillers used depends largely on the particular properties desired in the composite. Preferably, the ceramic filler is a carbide, nitride, boride, silicide or other similar ceramic refractory material. Ceramic oxides are not useful as fillers in the present invention.

Representative of ceramic carbides useful in the present process is the carbide of boron, chromium, hafnium, niobium, silicon, tantalum, titanium, vanadium, zirconium, and mixtures and solid solutions thereof. For example, the useful carbides include $B_4C$, $Cr_3C_2$, $HfC$, $NbC$, $SiC$, $TaC$, $TiC$, $VC$ and $ZrC$.

Representative of the ceramic nitrides useful in the present process is the nitride of hafnium, niobium, silicon, tantalum, titanium, vanadium, zirconium, and mixtures and solid solutions thereof. For example, the useful nitrides include $HfN$, $NbN$, $Si_3N_4$, $TaN$, $TiN$, $VN$ and $ZrN$.

Examples of ceramic borides are the borides of hafnium, niobium, tantalum, titanium, vanadium, zirconium, and mixtures and solid solutions thereof. More specifically, representative of the useful borides are $HfB_2$, $NbB$, $NbB_2$, $TaB$, $TaB_2$, $TiB_2$, $VB$, $VB_2$ and $ZrB_2$. Examples of useful silicides are $TaSi_2$, $MoSi_2$ and $WSi_2$.

The ceramic filler can be in any desired form such as, for example, a powder or filament or mixtures thereof. Generally, when the filler is in the form of a powder, it is characterized by a mean particle size which generally ranges from about 0.1 micron to about 1000 microns, preferably from about 0.2 micron to about 100 microns, and more preferably from about 0.5 micron to about 25 microns.

In one embodiment of the present invention, to produce a compact of particular porosity, or of high density, or a composite of particular microstructure, a particle size distribution of filler powder can be used with fractions of coarse or coarser particles being admixed with fractions of fine or finer particles so that the fine particles fit into the voids between the large particles and improve packing. Optimum distribution is determinable empirically.

As used herein, filament includes a whisker, discontinuous fiber or continuous fiber of filler. Generally, the discontinuous filaments have an aspect ratio of at least 10, and in one embodiment of the present invention it is higher than 50, and yet in another embodiment it is higher than 1000. Generally, the lower their aspect ratio, the higher is the packing which can be achieved in the compact since the small fibers intertwine or interlock. Also, generally, the higher the aspect ratio of the discontinuous fiber for a given volume fraction of filament, the better are the mechanical properties of the compact. In cases where the filaments are continuous in length, a large packing fraction is possible, for example, by arranging them in parallel or weaving them into cloth. Generally, the filament ranges from about 0.1 micron to about 20 microns in diameter and from about 10 microns to about 10 centimeters in length.

The filaments are used to impart desirable characteristics to the composite, such as improved stiffness strength, and toughness. In general, the greater the packing density of filaments, the greater is the improvement of such properties. Also, fibers with large aspect ratios usually are more effective in producing such improvement than are fibers having small aspect ratios.

In one embodiment of the present process, a mixture of filler powder and filaments is used to produce a compact of desired microstructure. The particular desired mixture of powder and filaments is determinable empirically.

Mixtures of ceramic filler powders and/or filaments can be produced by a number of conventional techniques.

In carrying out the present process, a mixture of the ceramic filler and solid constituent of the matrix composition is formed. The solid constituent can be comprised of a single component or a mixture of components of the matrix composition. Mixtures herein can be produced in a conventional manner. The solid constituent should be used in the amount required to produce the desired amount of matrix phase. The solid constituent is solid at infiltration temperature and is soluble and/or diffusible in the infiltrant constituent at an elevated temperature to produce the matrix phase in situ. The average particle size of the solid constituent is determinable empirically. It should be of a size which allows the formation of the present matrix phase by the present process, i.e., a matrix phase which is of homogeneous or substantially homogeneous composition. The smaller the particle size of the solid constituent, the faster it will dissolve and/or diffuse into the infiltrant constituent. If the solid constituent dissolves into the infiltrant at too fast a rate, portions of the dissolved solid constituent may be washed away so that the composition of the resulting matrix phase will be highly inhomogeneous. If the solid constituent is too large in size, it will dissolve or diffuse too slowly into the infiltrant to be practical. Generally, the solid constituent has a particle size ranging from about $2\mu$ to about $200\mu$.

The mixture of filler and solid constituent can be produced in a conventional manner. For example, the filler and solid constituent of the matrix can be admixed in a liquid medium in which they are inert under ambient conditions using, for example, a propeller blender, and the resulting dispersion can be dried in air at ambient temperature. Preferably, a uniform or substantially uniform mixture is formed.

The mixture comprised of ceramic filler and solid constituent of the matrix can be formed into a compact, i.e. preform or green body, of desired shape and size by a number of conventional techniques. For example, the mixture can be extruded, injection molded, die pressed, isostatically pressed or slip cast to produce the desired compact. Any lubricants, binders or similar materials used in shaping the compact should have no significant deleterious effect on the resulting composite. Such materials are preferably of the type which evaporate or burn off on heating at relatively low temperatures, preferably below 500° C., leaving no significant residue.

Preferably, the compact is formed into the shape and size required of the composite to allow the production of the required composite directly. The compact can be in any form desired, such as, for example, it can be hollow and/or of simple shape and/or of complex shape. The terms compact or preform refer to a non-sintered body prepared for infiltration later by the molten matrix material.

The ceramic filler in the compact has a particle or filament size, or a ratio of filaments and powder which is predetermined by the particular microstructure desired in the resulting composite.

The open porosity of the compact ranges from about 30% by volume to about 95% by volume, and preferably from about 35% by volume to about 75% by volume, of the compact. The open porosity of the compact depends mostly on the composition of the matrix desired in the resulting composite. Specifically, the open porosity of the compact determines the amount of liquid infiltrant which can be introduced into the compact to combine with the solid constituent to form the matrix phase. The open porosity of the compact also corresponds to the maximum volume fraction of matrix phase attainable in the composite. To produce a composite containing the matrix phase in an amount ranging from about 30% by volume to about 95% by volume of the composite, the compact should have an open porosity ranging from about 30% by volume to about 95% by volume of the compact, respectively.

By open porosity of the compact or body herein, it is meant pores or voids which are open to the surface of the compact or body thereby making the interior surfaces accessible to the ambient atmosphere.

Generally, the present compact has no closed porosity. By closed porosity it is meant herein closed pores or voids, i.e. pores not open to the surface of the compact or body and therefore not in contact with the ambient atmosphere.

Void or pore content, i.e. both open and closed porosity, can be determined by standard physical and metallographic techniques.

Preferably, the pores in the compact are small, preferably between about 0.1 micron and about 10 microns, and at least significantly or substantially uniformly distributed through the compact thereby enabling the production of a composite wherein the matrix phase is at least significantly or substantially uniformly distributed.

In the present process, the infiltrant constituent of the matrix has a liquidus temperature ranging from greater than about 1000° C. to less than about 1900° C., frequently from greater than about 1100° C. to less than 1700° C., and more frequently from about 1200° C. to about 1600° C. Also, the present infiltrant constituent has a viscosity at its liquidus temperature of less than about 30 poises, frequently less than about 10 poises, more frequently less than about 5 poises, and preferably less than about 1 poise. In addition, the infiltrant constituent of the matrix has a liquidus temperature which is at least 100° C. lower than that of the matrix, and/or it has a maximum viscosity which is at least 50% less than that of the matrix phase at a given infiltration temperature. Preferably, the infiltrant constituent has a liquidus temperature which is at least 300° C. lower, and more preferably at least 500° C. lower than that of the matrix. Also, preferably, the infiltrant constituent has a maximum viscosity which is at least 70%, more preferably at least 80% less than that of the matrix phase at a given infiltration temperature. By liquidus temperature herein, it is meant the temperature at which melting of the material is complete on heating.

The compositions of the solid and infiltrating constituents of the matrix can be determined by a number of techniques. For example, to determine the infiltrant constituent from the phase diagram showing the matrix phase, a composition or compound can be selected having a liquidus temperature at least 100° C. lower than that of the matrix, or a composition or compound can be selected because of its known low viscosity, or because its composition indicates that its viscosity should be low. Melt viscosity of a selected infiltrant composition or compound can be determined in a standard manner, or it can be calculated by various techniques disclosed in the art. For example, G. Urbain, "Viscosite et Structure de Silicoalumineux Liquides", *Rev. int. Htes Temp. et Refract.J*, 1974, t. II, pp. 133–145, discloses models for estimating the viscosity of melts of alkaline earth aluminosilicates, and J. D. Mackenzie, "The Discrete Ion Theory and Viscous Flow in Liquid Silicates", *Transactions of the Faraday Society*, No. 419, Vol. 53, Part 11, November 1957, discloses models for estimating the viscosity of melts of alkali and alkaline earth silicates. Preferably, the composition selected as the infiltrant constituent of the matrix composition has the lowest liquidus temperature and viscosity. Upon final selection of an infiltrant constituent, the solid constituent would be comprised of the remaining matrix composition and could also be selected from the phase diagram showing the matrix phase.

If desired, the specific compositions of the solid and infiltrant constituents of the matrix can be determined empirically. The sum of the constituents should produce the matrix phase by dissolution and/or diffusion.

The specific amounts of solid and liquid constituents needed to produce the required amount of matrix phase can be determined by a number of standard techniques. For example, amounts can be determined from the chemical equation showing the formation of the matrix composition from the solid and infiltrant constituents. In the present process, there is no reaction between the solid and infiltrant constituents.

The present process can be illustrated with reference to FIG. 3 for the production of a composite wherein the matrix phase is comprised of $CaO.2Al_2O_3$. From FIG. 3 it can be seen that $CaO.2Al_2O_3$ has a relatively high liquidus temperature of the order of about 1760° C. On the other hand, $12CaO.7Al_2O_3$ has a liquidus temperature of about 1360° C. and would be a useful infiltrant if its viscosity at its liquidus temperature is less than 30 poises. Also, from FIG. 3, it can be seen that the solid constituent would have to be $Al_2O_3$. Since FIG. 3 shows a number of compounds containing $Al_2O_3$ in amounts higher than that contained in $12CaO.7Al_2O_3$, Al₂O₃ should be soluble and/or diffusible in 12 CaO.-7Al₂O₃ at an elevated temperature to produce CaO.2Al₂O₃. The following chemical equation can be used to determine the required amounts of the constituents:

$$12CaO.7Al_2O_3 + 17Al_2O_3 \rightarrow 12(CaO.2Al_2O_3) \tag{1}$$

In a preferred embodiment, the present process is directed to forming a matrix phase in situ comprised of an alkaline earth aluminosilicate. These materials generally have a high liquidus temperature and/or high viscosity. Specifically, in the embodiment the matrix composition can be represented as BaO.Al₂O₃.2SiO₂, 2CaO.Al₂O₃.SiO₂, CaO.Al₂O₃.2SiO₂, 2MgO.2Al₂O₃.5SiO₂, 4MgO.5Al₂O₃.2 SiO₂, SrO.Al₂O₃. SiO₂, 2SrO.Al₂O₃.SiO₂ and 6SrO.9Al₂O₃.2SiO₂ wherein each oxidic constituent can vary from the stoichiometric formula. These alkaline earth aluminosilicates can also be represented in terms of their oxidic constituents, i.e. MO, Al₂O₃ and SiO₂, by the general formula xMO.Al₂O₃.zSiO₂ where M=Ba, Ca, Mg, Sr and mixtures thereof, where x is 1, 2, 4 or 6, y is 1, 2, 5 or 9 and z is 1, 2 or 5. Each oxidic constituent in such stoichiometric formula can range up to ±50%, preferably less than ±10% from its stoichiometric composition.

As an illustration, cordierite (2MgO.2Al₂O₃.5SiO₂) has a viscosity of about 36 poise at its liquidus temperature of about 1540° C. The matrix composition 2MgO.2Al₂O₃.5SiO₂ can be synthesized from a combination of components, e.g., $$(a)\ 2(MgO..4Al_2O_3.1.3SiO_2) + [1.2Al_2O_3 + 2.4SiO_2] \tag{2}$$

or $$(b)\ 2(MgO.O0.4Al_2O_3.1.3SiO_2) + [0.4\ Mullite + 1.6SiO_2] \tag{3}$$

or $$(c)\ 2(MgO.0.4Al_2O_3.2.1SiO_2) + [0.4\ Mullite] \tag{4}$$

In the above, the () means liquid and the [] means solids. The infiltrant constituent in (a), (b) and (c) has a liquidus temperature at least 100° C. lower than that of cordierite, a viscosity lower than 20 poises at liquidus temperature and a viscosity which is at least 50% lower than that of cordierite at infiltration temperature.

In carrying out the present process, the infiltrant constituent is placed in contact with the compact and such contact can be in a number of forms. Preferably, to inhibit its vaporization during infiltration, the infiltrant powder is compacted into a pressed powder form or it is used in the form of large granules. Preferably, a layer of infiltrant is deposited on as large as possible a surface area of the compact to promote infiltration. In one embodiment of the present invention, an aqueous slurry of infiltrant powder is coated on the surface of the compact and dried leaving a coating, preferably a continuous coating, of infiltrant.

Preferably, the amount of infiltrant in contact with or deposited on the compact is sufficient to infiltrate the compact so that infiltration can be completed in a single step. However, if desired, the compact can be partially infiltrated and the infiltration repeated until the desired composite is produced.

Should the filler contain desorbable material on its surface, the structure comprised of the infiltrant in contact with the compact preferably is heated initially to an elevated temperature below the melting point of the infiltrant, typically from about 800° C. to below the melting point of the infiltrant, for a period of time sufficient to degas the compact, typically for about 10 minutes. Degassing temperature and time are determinable empirically. Generally, such degassing is necessary when the filler has desorbable material on its surface, such as hydrogen chloride, which would lead to gas evolution during the infiltration causing gas pockets or gross porosity. The completion of degassing is indicated by the stabilization of the pressure in the furnace.

After degassing, if any, the temperature is increased to a temperature at which the infiltrant constituent is liquid and the compact is solid to infiltrate the liquid infiltrant into the open pores of the compact. The infiltration temperature ranges from the liquidus temperature of the infiltrant constituent to a temperature at which no significant vaporization of infiltrant occurs. Generally, with increasing infiltration temperature, the viscosity of the infiltrant decreases. The particular infiltration temperature is determinable empirically, and typically it ranges from greater than about 1000° C. to about 1900° C., frequently from about 1150° C. to about 1750° C., and more frequently from about 1210° C. to about 1650° C. Preferably, to prevent significant vaporization of the infiltrant, infiltration is carried out at as low a temperature as possible, and preferably no higher than about 50° C. above the liquidus temperature of the infiltrant. To ensure infiltration of the compact, the entire compact should be at or above the liquidus temperature of the infiltrant during infiltration. Infiltration time can vary, but generally infiltration is completed within about an hour.

Generally, the heating rate to below or just below the melting point of the infiltrant ranges up to about 100° C. per minute. Commencing just below the melting point of the infiltrant, i.e. preferably within about 15 degrees of the onset of the melting, and continuing to the maximum infiltration temperature, the heating rate preferably ranges from about 1° C. to about 10° C. per minute, more preferably from about 1° C. to about 5° C. per minute, to facilitate controlled infiltration of the liquid infiltrant into the porous compact. Overheating may cause significant vaporization of the infiltrant and may interfere with the present infiltration and also may cause undesirable deposition in the heating apparatus.

If, upon completion of the infiltration step all or substantially all of the constituents have not combined to produce the matrix phase, which is determinable in a conventional manner, the infiltrated compact is homogenized, i.e., it is heated at a homogenization temperature at which all or substantially all of the solid constituent dissolves and/or diffuses into the infiltrant constituent to produce the matrix phase in a period of time of less than 100 hours. The homogenization temperature can range widely and is determinable empirically. Generally, it ranges from about 50% of the absolute liquidus temperature to about the absolute liquidus temperature of the matrix phase, and frequently, from higher than about 1000° C. to a temperature at which the infiltrant constituent is liquid. Preferably, homogenization is completed in less than 50 hours, more preferably less than 30 hours and most preferably less than 10 hours. Homogenization should have no significant deleterious effect on the composite.

At the completion of infiltration or homogenization, the matrix phase may be amorphous and/or polycrystalline. If it is amorphous, or partly amorphous, the composite can be cooled at a rate determinable empirically which may make it polycrystalline, and frequently this requires quenching. However, for some amorphous matrix compositions, an annealing of the composite at an elevated temperature below the homogenization temperature, determinable empirically or known in the art, may be required to induce crystallization. Also, for some matrix compositions, the inclusion of a nucleating agent in the starting materials may be required to produce a polycrystalline matrix phase.

Generally, after infiltration or homogenization, the rate of cooling can vary and is not critical, but it should have no significant deleterious effect on the composite. Specifically, cooling should be at a rate which avoids cracking of the composite, and this is determinable empirically depending largely on the geometry and size of the piece. Generally, a cooling rate of less than about 50° C. per minute is useful for small bodies of simple shape and a cooling rate as great as about 20° C. per minute or higher is useful for large bodies of complex shape. Preferably, the composite is cooled to ambient temperature prior to removal from the heating apparatus.

The present process is carried out in an atmosphere in which the ceramic filler and matrix constituents are inert or substantially inert, i.e., an atmosphere which has no significant deleterious effect thereon. Specifically, the process atmosphere should be one in which no significant reaction between the filler and matrix or matrix constituents takes place. Reaction involving the filler will degrade the mechanical properties of the resulting composite. Preferably, the process atmosphere maintains the inertness of the filler so that no reaction between the filler and matrix or matrix constituents takes place which is detectable by scanning electron microscopy. Also, the process atmosphere should be non-oxidizing with respect to the ceramic filler. The particular process atmosphere is determinable empirically and depends largely on the ceramic filler used. Generally, the process atmosphere can be comprised of or contain nitrogen, a noble gas, preferably argon or helium, and mixtures thereof. However, when the filler is a ceramic carbide, the process atmosphere preferably should contain at least a partial pressure of carbon monoxide determinable empirically or by thermodynamic calculation which is at least sufficient to prevent reaction or significant reaction between the carbide and matrix or matrix constituents. Also, when the filler is a ceramic nitride, the process atmosphere preferably should contain at least a partial pressure of nitrogen determinable empirically or by thermodynamic calculation which is at least sufficient to prevent reaction or significant reaction between the nitride and the matrix or matrix constituents, and preferably the atmosphere is nitrogen.

The pressure of the process atmosphere can vary widely and is determinable empirically or by thermodynamic calculations and depends largely on the dissociation and/or reaction pressures of the particular ceramic filler and infiltrant and the temperature required for infiltration. More specifically, the process atmosphere can range from below to above ambient pressure, and preferably it is at ambient, i.e. atmospheric or about atmospheric. When the process atmosphere is at reduced pressure, typically it can range from about 0.1 torr up to ambient, and frequently, it ranges from about 100 torr to about 400 torr. When the process atmosphere is above ambient, it is convenient to restrict it to below 10 atmospheres.

Any excess infiltrant on the surface of the composite can be removed by a number of techniques, such as, for example, by gentle scraping or abrading.

The present composite does not contain any significant amount of any constituent or component of the matrix or of any reaction product of ceramic filler and matrix or matrix constituent. Preferably, the present composite does not contain any constituent or component of the matrix or any reaction product of ceramic filler and matrix or matrix constituent which is detectable by X-ray diffraction analysis, and more preferably, which is detectable by scanning electron microscopy.

The composite produced by the present process has a porosity of less than about 10% by volume, preferably less than about 5% by volume, more preferably less than about 1% by volume, and most preferably, it is pore-free, i.e., it is fully dense.

Generally, in the present process, there is no significant loss of the components used to form the composite.

The matrix phase is continuous and interconnecting, and generally, it is distributed evenly or substantially evenly through the composite. Also, generally, the matrix phase envelops more than 25% by volume, preferably more than 50% by volume, of the individual filler members, i.e., particles and/or filaments.

The present invention makes it possible to fabricate a composite of the desired shape and size directly. For example, the composite produced by the present process can be in the form of a flat body, a crucible, a hollow shaped article, a long rod, a gasket, or a wear resistant part such as a bushing. Since the present composite can be produced in a predetermined configuration of predetermined dimensions, it would require little or no machining.

The composite produced by the present process has a number of uses depending largely on its particular composition and microstructure. For example, it may be useful as a high temperature structural material, as a vane, or as a wear resistant part such as a bushing.

The invention is further illustrated by the following examples where the procedure was as follows unless otherwise noted:

Each preform, i.e. compact, had an open porosity of roughly about 50% by volume of the preform. The pores in the preform ranged from about 0.1 micron to about 10 microns.

The composite produced in each example was diamond polished for microscopic examination.

EXAMPLE 1

This example was directed to the formation of a cordierite phase in situ.

One gram of 2-5 micron silicon carbide powder was hand mixed with 1 gram of a 3:2 (molar basis) blend of $SiO_2$ and $Al_2O_3$ powders respectively followed by sieving the mixture. The $Al_2O_3$ and $SiO_2$ powders had an average particle size of about 2-5μ. The mixture was pressed into a disk-shaped compact of substantially uniform thickness of about 3 mm.

The compact was placed on a carbon felt mat and its top surface was covered with a layer of 3.5 grams of $MgSiO_3$ granules.

The resulting structure was placed in a carbon mold such as shown in FIG. 1 and heated by induction under a reduced pressure of about 1 torr to about 1650° C. where it was held for about 10 minutes and then subjected to a rapid cool-down at a rate of about 100° C. per minute to ambient temperature. At the infiltration temperature of about 1650° C., MgSiO₃ has a viscosity at least 50% less than that of cordierite.

Examination of the resulting composite showed that infiltration of the MgSiO₃ into the compact occurred resulting in a dense composite having no measurable open porosity. The composite had a continuous interconnecting matrix phase which appeared glassy. On the basis of calculations based on the available free volume in the compact in which the molten MgSiO₃ could flow, it was known that the composition of the matrix phase corresponded to that of cordierite. No attempt was made to crystallize the matrix to the cordierite structure.

EXAMPLE 2

This example was directed to the formation of a strontium feldspar ($SrO.Al_2O_3.2SiO_2$) phase in situ.

1.5 grams of 2-5 micron silicon carbide powder was hand mixed with 0.5 gram of a 1:1 (molar basis) blend of $Al_2O_3$ and $SiO_2$ powders followed by sieving the mixture. The $Al_2O_3$ and $SiO_2$ powders had an average particle size of about 2-5μ. The mixture was pressed into a disk-shaped compact of substantially uniform thickness of about 3 mm.

The compact was placed on a carbon felt mat and its top surface was covered with a layer of 3.0 grams of SrSiO₃ granules.

The resulting structure was heated in an induction furnace contained in an enclosure under a reduced pressure of about 1 torr to about 1600° C. where it was held for about 10 minutes and then subjected to a rapid cool-down at a rate of about 100° C. per minute to ambient temperature. SrSiO₃ has a liquidus temperature at least 100° C. lower than that of strontium feldspar, and at the infiltration temperature of about 1600° C., its viscosity is at least 50% less than that of strontium feldspar.

Examination of the resulting composite showed that infiltration of the SrSiO₃ into the compact occurred resulting in a dense composite having no measurable open porosity. The composite had a continuous interconnecting matrix phase which appeared glassy. On the basis of calculations based on the available free volume in the compact into which the molten SrSiO₃ could flow, it was known that the composition of the glassy matrix phase corresponded closely to that of strontium feldspar. No attempt was made to crystallize the matrix to the strontium feldspar structure.

What is claimed is:

1. A process for producing a composite consisting essentially of from about 30% by volume to about 95% by volume of a continuous interconnecting polycrystalline inorganic matrix phase and from about 5% by volume to about 70% by volume of a polycrystalline ceramic filler phase, said filler phase being free of oxide filler phase, said composite having a porosity of less than about 10% by volume which consists essentially of forming a mixture of ceramic filler and a solid inorganic constituent of said matrix phase, shaping said mixture into a compact having an open porosity ranging from about 30% by volume to about 95% by volume of the compact, contacting said compact with an infiltrant which is the remaining constituent of said matrix phase, said infiltrant constituent having a liquidus temperature lower than 1900° C. and a viscosity of less than 30 poises at its liquidus temperature, heating the resulting structure to an infiltration temperature ranging from the liquidus temperature of said infiltrant constituent to below the temperature at which there is significant vaporization of said infiltrant constituent, said infiltrant constituent having a liquid temperature at least 100° C. lower than that of said matrix phase or a maximum viscosity at least 50% less than that of said matrix phase at said infiltration temperature, and infiltrating the resulting liquid infiltrant constituent into said compact to produce said composite, at said infiltration temperature said solid constituent being a solid and dissolvable and/or diffusible into said infiltrant constituent to form said matrix phase, said infiltration being carried out in an atmosphere non-oxidizing with respect to said filler and in which no significant reaction between said filler and said matrix takes place.

2. The process according to claim 1 wherein said matrix phase is comprised of $2MgO.2Al_2O_3.5SiO_2$, and said solid constituent is selected from the group consisting of $Al_2O_3$, $SiO_2$ and a mixture thereof.

3. The process according to claim 1 wherein said matrix phase is comprised of $2MgO.2Al_2O_3.5SiO_2$, said solid constituent is comprised of a particulate mixture of about 80 mole % $SiO_2$ and about 20 mole % $Al_2O_3$ and said infiltrant constituent is MgSiO₃.

4. The process according to claim 1 wherein said matrix phase is comprised of $SrO.Al_2O_3.2SiO_2$, and said solid constituent is selected from the group consisting of $Al_2O_3$, $SiO_2$ and a mixture thereof.

5. The process according to claim 1 wherein said matrix phase is comprised of $SrO.Al_2O_3.2SiO_2$, said solid constituent is comprised of a particulate 1:1 molar mixture of $Al_2O_3$ and $SiO_2$, and said infiltrant constituent is SrSiO₃.

6. The process according to claim 1 wherein said ceramic filler contains desorbable material and wherein said structure is heated to an elevated temperature below the melting point of said infiltrant constituent for a time sufficient to degas the desorbable material before said structure is heated to said infiltration temperature.

7. The process according to claim 1 carried out at ambient pressure.

8. A process for producing a composite consisting essentially of from about 30% by volume to about 95% by volume of a continuous interconnecting polycrystalline oxygen-containing inorganic matrix phase and from about 5% by volume to about 70% by volume of a polycrystalline ceramic filler phase, said filler phase being free of oxide filler phase, said composite having a porosity of less than about 10% by volume, which consists essentially of forming a mixture of cermaic filler and a solid inorganic constituent of said matrix phase, shaping said mixture into a compact having an open porosity ranging from about 30% by volume to about 95% by volume of the compact, contacting said compact with an infiltrant which is the remaining constituent of said matrix phase, said infiltrant constituent having a liquidus temperature lower than 1900° C. and a viscosity of less than 30 poises at its liquidus temperature, heating the resulting structure to an infiltration temperature ranging from the liquidus temperature of said infiltrant constituent to below the temperature at which there is significant vaporization of said infiltrant constituent, infiltrating the resulting liquid infiltrant into said compact, and heating the resulting infiltrated compact at a homogenization temperature at which substantially all of said solid constituent dissolves and/or diffuses into said infiltrated constituent forming said matrix phase in a period of time of less than 100 hours to produce said composite, said homogenization temperature ranging from about 50% of the absolute liquidus temperature to about the absolute liquidus temperature of said matrix phase, said infiltrant constituent having a liquidus temperature at least 100° C. lower than that of said matrix phase or a maximum viscosity at least 50% less than that of said matrix phase at infiltration temperature, said solid constituent being a solid at said infiltration temperature and dissolvable and/or diffusible into said infiltrant constituent at said homogenization temperature, said infiltration being carried out in an atmosphere non-oxidizing with respect to said filler and in which no significant reaction between said filler and said matrix takes place.

9. The process according to claim 8 wherein said matrix phase is comprised of CaO.2Al$_2$O$_3$, said solid constituent is Al$_2$O$_3$, and said infiltrant constituent is 12CaO.7Al$_2$O$_3$.

10. The process according to claim 8 wherein said ceramic filler contains desorbable material and wherein said structure is heated to an elevated temperature below the melting point of said infiltrant constituent for a time sufficient to degas the desorbable material before said structure is heated to said infiltration temperature.

11. The process according to claim 8 carried out at ambient pressure.

12. A process for producing a composite consisting essentially of from about 30% by volume to about 95% by volume of a continuous interconnecting polycrystalline alkaline earth aluminosilicate matrix phase and from about 5% by volume to about 70% by volume of a polycrystalline ceramic filler phase, said filler phase being free of oxide filler phase, said composite having a porosity of less than about 10% by volume, said matrix phase being represented by the stoichiometric formula xMO.yAl$_2$O$_3$.zSiO$_2$, wherein M=Ba, Ca, Mg, Sr and a mixture thereof, where x is 1, 2, 4 or 6, where y is 1, 2, 5 or 9, where z is 1, 2 or 5 and wherein each oxidic constituent of said stoichiometric formula ranges up to +50% from its stoichiometric composition, which consists essentially of forming a mixture of ceramic filler and a solid constituent of said matrix phase, shaping said mixture into a compact having an open porosity ranging from about 30% by volume to about 95% by volume of the compact, contacting said compact with an infiltrant which is the remaining constituent of said matrix phase, said infiltrant constituent having a liquidus temperature lower than 1900° C. and a viscosity of less than 30 poises at its liquid temperature, heating the resulting structure to an infiltration temperature ranging from the liquidus temperature of said infiltrant constituent to below the temperature at which there is significant vaporization of said infiltrant constituent, infiltrating the resulting liquid infiltrant constituent into said compact, and heating the resulting infiltrated compact at a homogenization temperature at which substantially all of said solid constituent dissolves and/or diffuses into said infiltrated constituent forming said matrix phase in a period of time of less than 100 hours to produce said composite, said homogenization temperature ranging from about 50% of the absolute liquidus temperature to about the absolute liquidus temperature of said matrix phase, said infiltrant constituent having a liquidus temperature at least 100° C. lower than that of said matrix phase or a maximum viscosity at least 50% less than that of said matrix phase at said infiltration temperature, said solid constituent being a solid at said infiltration temperature and dissolvable and/or diffusible into said infiltrant constituent at said homogenization temperature, said infiltration being carried out in an atmosphere non-oxidizing with respect to said filler and in which no significant reaction between said filler and said matrix takes place.

13. The process according to claim 12 wherein said solid constituent is selected from the group consisting of Al$_2$O$_3$, SiO$_2$ and a mixture thereof.

14. The process according to claim 12 wherein said M is Mg and said infiltrant constituent is MgSiO$_3$.

15. The process according to claim 12 wherein said matrix phase is 2MgO.2Al$_2$O$_3$.5SiO$_2$, and said solid constituent is selected from the group consisting of Al$_2$O$_3$, SiO and a mixture thereof.

16. The process according to claim 12 wherein said matrix phase is 2MgO.2Al$_2$O$_3$.5SiO$_2$, said solid constituent is SiO$_2$, and said infiltrant constituent is MgO.Al$_2$O$_3$.SiO$_2$.

17. The process according to claim 12 wherein said matrix phase is comprised of 2MgO.2Al$_2$O$_3$.5SiO$_2$, said solid constituent is comprised of a particular mixture of about 80 mole % SiO$_2$ and about 20 mole % Al$_2$O$_3$ and said infiltrant constituent is MgSiO$_3$.

18. The process according to claim 12 wherein said matrix phase is SrO.Al$_2$O$_3$.2SiO$_2$, and said solid constituent is selected from the group consisting of Al$_2$O$_3$, SiO$_2$, and a mixture thereof.

19. The process according to claim 12 wherein said matrix phase is comprised of SrO.Al$_2$O$_3$.2SiO$_2$, said solid constituent is comprised of a particulate 1:1 molar mixture of Al$_2$O$_3$ and SiO$_2$, and said infiltrant constituent is SrSiO$_3$.

20. The process according to claim 12 wherein said ceramic filler contains desorbable material and wherein said structure is heated to an elevated temperature below the melting point of said infiltrant constituent for a time sufficient to degas the desorbable material before said structure is heated to said infiltration temperature.

21. The process according to claim 12 carried out at ambient pressure.

22. The process according to claim 12 wherein said ceramic filler phase is comprised of a ceramic carbide selected from the group consisting of boron carbide, hafnium carbide, niobium carbide, silicon carbide, tantalum carbide, titanium carbide, vanadium carbide, zirconium carbide and a mixture thereof.

23. The process according to claim 12 wherein said ceramic filler phase is comprised of a ceramic nitride selected from the group consisting of hafnium nitride, niobium nitride, silicon nitride, tantalum nitride, titanium nitride, vanadium nitride, zirconium nitride and a mixture thereof.

24. The process according to claim 12 wherein said ceramic filler phase is comprised of a ceramic boride selected from the group consisting of HfB$_2$, NbB, NbB$_2$, TaB, TaB$_2$, TiB$_2$, VB, VB$_2$, ZrB$_2$ and a mixture thereof.

25. The process according to claim 12 wherein said 65% composite is comprised of from about 25% by volume to about 35% by volume of said ceramic filler phase, and from about by volume to about 75% by volume of said matrix phase.

26. The process according to claim 12 wherein said composite has a porosity of less than 5% by volume.

* * * * *